United States Patent [19]

Kato

[11] Patent Number: 4,579,225
[45] Date of Patent: Apr. 1, 1986

[54] DISC CARTRIDGE

[75] Inventor: Yoshitake Kato, Ibaragi, Japan

[73] Assignee: Hitachi Maxell Ltd., Osaka, Japan

[21] Appl. No.: 678,817

[22] Filed: Dec. 6, 1984

[30] Foreign Application Priority Data

Dec. 8, 1983 [JP] Japan .................... 58-232558

[51] Int. Cl.$^4$ ............................ B65D 85/672
[52] U.S. Cl. ................................ 206/387
[58] Field of Search ........................ 206/387

[56] References Cited

U.S. PATENT DOCUMENTS 4,469,225 9/1984 Takahashi ................ 206/387

Primary Examiner—Joseph Man-Fu Moy
Attorney, Agent, or Firm—Birch, Stewart, Kolasch & Birch

[57] ABSTRACT

In a disc cartridge comprising a top half and a bottom half assembled together to provide a disc case for rotatably accommodating a disc. A shutter member is slidably assembled to the disc case with at least one projection formed on the shutter member for engaging a guide slot defined along one edge of the disc case. A slit is defined extending from the one edge to the guide slot so that a resilient deformable portion is formed, whereby when the shutter member is assembled to the disc case, the resilient deformable portion can be resiliently deformed by the force applied to resilient deformable member by the projection of the shutter member for allowing the projection to ride over the resilient deformable portion.

6 Claims, 10 Drawing Figures

DISC CARTRIDGE

FIELD OF THE INVENTION

The present invention relates to a disc cartridge having a shutter means for shutting head insertion openings of the disc cartridge.

BACKGROUND OF THE INVENTION

Referring to FIGS. 1 to 4, there is shown a conventional disc cartridge, wherein a top half 1a and a bottom half 1b are assembled together to form a disc cartridge 1 and a magnetic floppy disc 2 is rotatably enclosed in a chamber formed between the top half 1a and the bottom half 1b. A shutter 3 having a pair of opposed plates 3a and 3b connected by a front plate 3c as shown in FIG. 3, is movably fitted to the recessed portion 4 of the disc cartridge 1 for opening and closing a head insertion hole 7. In the process of mounting the shutter 3 to the disc cartridge 1 from the front, the cartridge case is fitted in the gap between both plates 3a and 3b of the shutter 3 and the shutter 3 is moved backward, a projection 5 formed on the shutter 3 projected inwardly, deforms the wall of the recessed portion 4, thus the projection 5 is slidably engaged in a guide slot 6. However, the resistance to the deformation of the recessed portion is high since the wall of the recessed portion 4 is in the form of a beam supported at both side edges by the side walls of the disc cartridge, having a flat plate member; therefore, the recessed portion 4 is not easily deformed by the projection 5 in the process of mounting the shutter 3, whereby the force for inserting the shutter 3 changes from one disc cartridge to another, and there tends to occur incorrect mounting of the shutter to the disc cartridge.

SUMMARY OF THE INVENTION

An essential object of the present invention is to provide a disc cartridge in which the shutter for closing the head insertion hole can be mounted easily and correctly.

According to the present invention, there is provided a disc cartridge comprising a top half and a bottom half assembled together to provide a disc case for rotatably accommodating a disc. A shutter member is slidably assembled to the disc case with at least one projection formed on the shutter member to engage a guide slot defined along one edge of the disc case and at least one slit extending from the one edge to the guide slot so that a resilient deformable means is formed, whereby when the shutter member is assembled to the disc case, the resilient deformable means can be resiliently deformed by the force applied thereto by the projection of the shutter member thereby allowing the projection to ride over the resilient deformable means.

The provision of the slit makes it easy for the resilient deformable portion to be deformed when the projection of the shutter rides over the resilient deformable means, so that the shutter can easily be assembled to the disc cartridge at a reduced force, whereby the work of assembling the shutter can be improved and break down of the disc cartridge can be effectively prevented.

DETAILED DESCRIPTION OF THE PREFERRED EMBODIMENT

Figure 1:
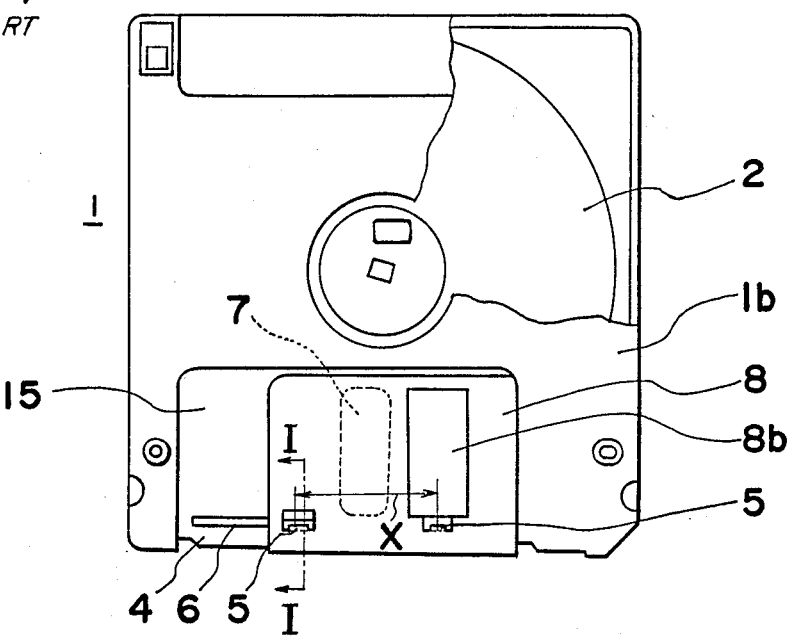
FIG. 1 is a top plan view showing a conventional disc cartridge.
Figure 2:
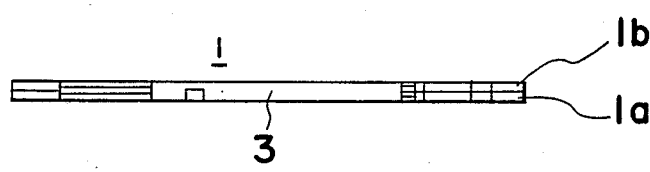
FIG. 2 is a front view of the disc cartridge shown in FIG. 1.

Before the description of the invention proceeds, it is noted that like parts are designated by like reference numerals throughout the attached drawings.

Referring to FIGS. 5 through 9, the top half 1a and the bottom half 1b of the disc case 1 are formed by molding plastic resin materials and the magnetic or optical recording disc 2 is rotatably enclosed in the disc cartridge with a hub 14 of the recording disc 2 faced to drive shaft insertion holes 13 defined on the top and bottom halves 1a and 1b. Head insertion holes 7 are defined on the top and bottom halves 1a and 1b extending in the radial direction of the recording disc 2 and when the top half 1a and the bottom half 1b are assembled together the head insertion holes 7 are opposed each other. Each of the head insertion holes 7 serves as a pad insertion hole. The shutter 3 is movably mounted on the recessed portion for closing and opening the head insertion holes 7.

When the disc cartridge is mounted in a disc drive device, the shutter 3 is moved to open the head insertion holes 7 and a recording head and a pad in the disc drive device are contacted to the recording disc 2 for recording or reproducing.

Figure 3:
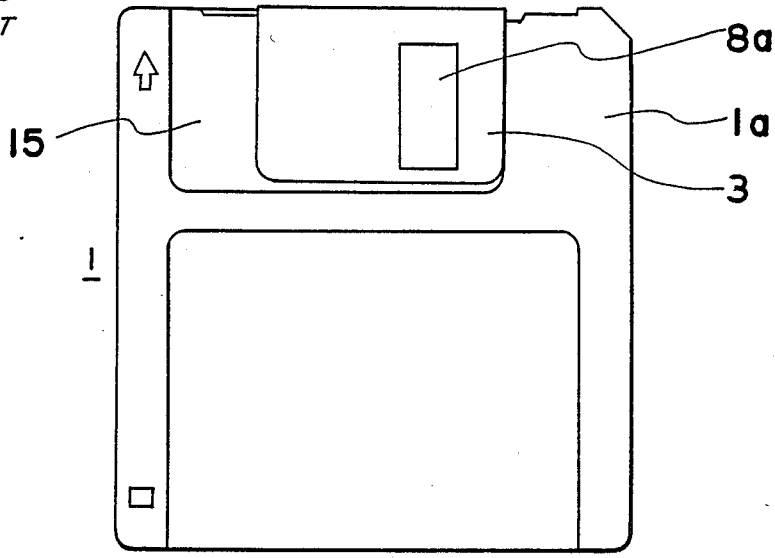
FIG. 3 is a bottom plan view of the disc cartridge shown in FIG. 1.
Figure 4A:
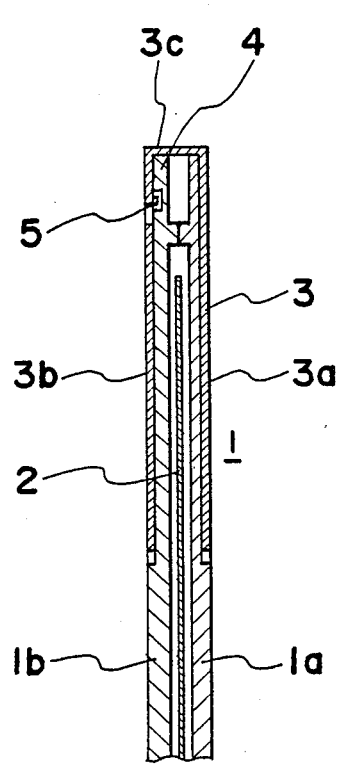
FIG. 4a is a cross sectional view taken along the lines I—I in FIG. 1 with the shutter mounted.
Figure 4B:
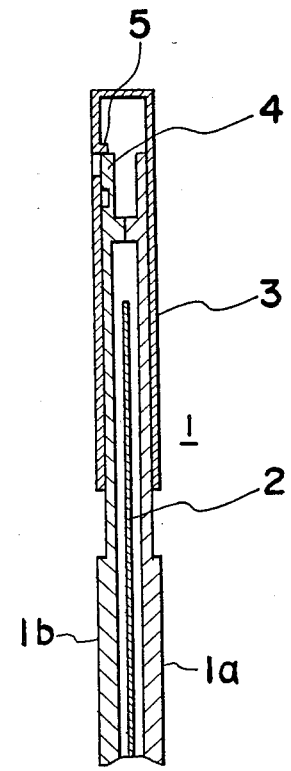
FIG. 4b is a cross sectional view taken along the lines I—I in FIG. 1 with the shutter removed.
Figure 5:
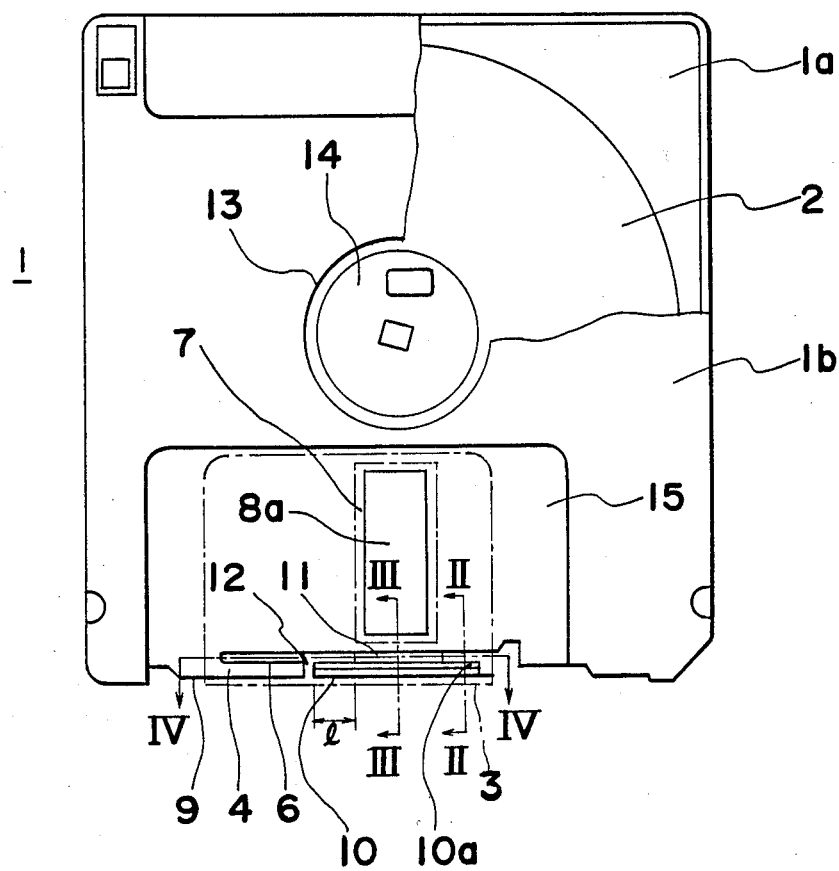
FIG. 5 is a top plan view of one embodiment of the disc cartridge according to the present invention with a portion broken.
Figure 6:
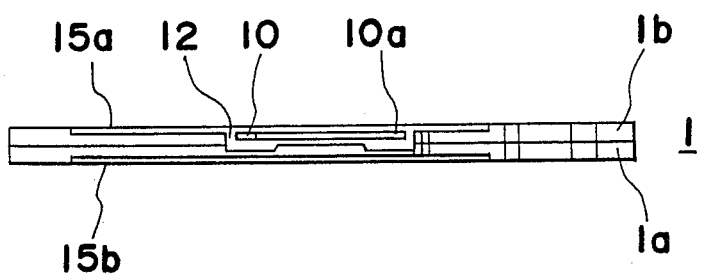
FIG. 6 is a front view of the disc cartridge shown in FIG. 5.
Figure 7:
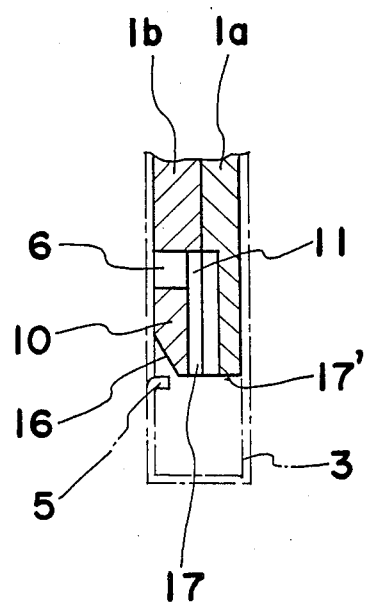
FIG. 7 is a cross sectional view taken along the lines II—II in FIG. 5.
Figure 8:
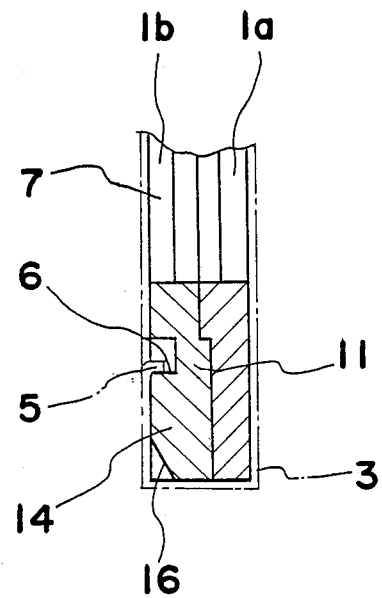
FIG. 8 is a cross sectional view taken along the lines III—III in FIG. 5.
Figure 9:
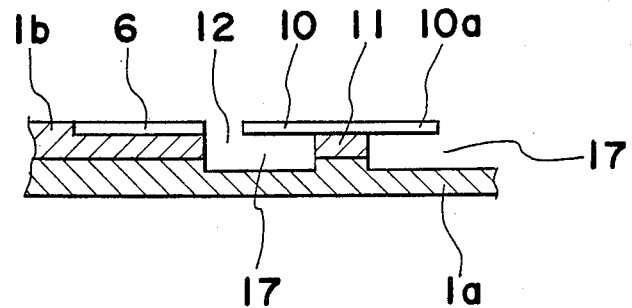
FIG. 9 is a cross sectional view taken along the lines IV—IV in FIG. 5.

The shutter 3 is made is a stainless steel plate formed in a generally U character shape in side view and is provided with a pair of holes 8a and 8b similar to the head insertion hole 7 in a similar manner as shown in FIGS. 1 and 3. In order to engage the engaging projection 5 of the shutter 3 in the guide slot 6, it is necessary to deform the front edge portion of the bottom half 1b of the disc cartridge by the force of insertion of the shutter 3. In order to facilitate deformation of the front edge portion of the bottom half 1b, there is defined a slit 12 on the front edge portion of the bottom half 1b so as to extend from the front edge of the bottom half 1b to the guide slot 6 so that an elongated resilient deformable portion 10 is formed in a canti lever manner surrounded by the guide slot 6 and the slit 12. The resilient deformable portion 10 is supported by a conducting member 11 which protrudes from the front end portion of the bottom half 1b, thus there are two resilient deformable portions 10 and 10a formed on both sides of the connecting member 11. The length of the space between the portions 10 and 10a is defined corresponding to the length of the space X between the two projections 5 of the shutter 3 (see FIG. 1) In this arrangement, when the shutter 3 is assembled to the disc cartridge 1 from the front, the projections 5 push the resilient deformable portions 10 and 10a downward deforming the portions 10 and 10a into the space 17 between the front portion of the top and bottom halves 1a and 1b, and in turn the projections 5 can be inserted into the guide slot 6 riding over the resilient deformable portions 10 and 10a, then the resilient deformable portions 10 and 10a can recover to the original straight shape, thus the shutter 3 can be moved in both lateral directions guided along the guide slot 6, preventing disengagement of the projection 5 from the guide slot 6. The upper front end portion of the resilient deformable portion 10 may be beveled as shown at the reference numeral 16 in FIG. 7, so as to facilitate projection 5 riding over the resilient deformable portion 10 and insertion of the projection 6 in the guide slot 5. By making the resilient deformable portions 10 and 10a in a cantilever manner as described above, the length l of the portions 10 and 10a can be as long as possible, so that the deformation resistance can be decreased. The front edge portion of the top half 1a is formed with a right angle corner 17' for preventing erroneous assembling of the shutter member with the top and bottom reversed. In this embodiment, although two resilient deformable portions 10 and 10a are formed in a cantilever manner supported by the connecting portion 11 corresponding to the projections 5 of the shutter 3, the portion 10 may be a single deformable portion. By providing only one portion 10, it makes it possible to enlarge the resilient deformable portion 10 so that the resistance of the deformation of the resilient deformable portion 10 may be even smaller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc cartridge comprising a top half and a bottom half assembled together to provide a disc case for rotatably accommodating a disc, a shutter member slidably assembled to the disc case with at least one projection formed on said shutter member to engage a guide slot defined along one edge of at least one half of said disc case and at least one slit extending from said one edge to said guide slot so that a resilient deformable means is formed as a part of said at least one half of said disc case, whereby when said shutter member is assembled to said disc case, said resilient deformable means is resiliently deformed by a force applied to said resilient deformable means by said at least one projection of said shutter member allowing said projection to ride over said resilient deformable means.

2. The disc cartridge according to claim 1, wherein said shutter member is provided with two separate engaging projections and a part of said guide slot is opened through the slit to provide at least one resilient deformable means.

3. The disc cartridge according to claim 2, wherein said resilient deformable means is formed in a cantilever manner by the guide slot with said slit to form two resilient deformable means.

4. The disc cartridge according to claim 1, wherein an upper front end portion of said resilient deformable means is beveled.

5. The disc cartridge according to claim 4, wherein said shutter member is provided with projections only on one plate of said shutter member and a front edge portion of said disc case opposite to said resilient deformable means is shaped at a right angle.

6. The disc cartridge according to claim 3, wherein said two resilient deformable means are connected together at an intermediate portion of one edge portion of said disc case and each of said resilient deformable means are formed in said cantilever manner supported by said connected portion.

* * * * *